(12) United States Patent
Giordano

(10) Patent No.: US 7,390,024 B2
(45) Date of Patent: *Jun. 24, 2008

(54) ALL-PURPOSE PRESSURE TEST KIT

(76) Inventor: Louis Giordano, 6185 Ridgebury Blvd., Mayfield Village, OH (US) 44124

( * ) Notice: Subject to any disclaimer, the term of this patent is extended or adjusted under 35 U.S.C. 154(b) by 149 days.

This patent is subject to a terminal disclaimer.

(21) Appl. No.: 11/148,060

(22) Filed: Jun. 8, 2005

(65) Prior Publication Data

US 2005/0264011 A1  Dec. 1, 2005

Related U.S. Application Data

(63) Continuation of application No. 10/619,312, filed on Jul. 14, 2003, now abandoned, which is a continuation of application No. 09/993,232, filed on Nov. 16, 2001, now Pat. No. 6,612,618.

(51) Int. Cl.
*F16L 25/00* (2006.01)
(52) U.S. Cl. .................. 285/12; 285/93; 285/334.1; 285/148.23; 73/49.5; 73/49.1
(58) Field of Classification Search ................ 285/12, 285/93, 333, 334.1, 334.4, 901, 334.5, 148.18, 285/148.23; 73/49.8, 49.5, 49.1, 37
See application file for complete search history.

(56) References Cited

U.S. PATENT DOCUMENTS

| | | |
|---|---|---|
| 994,441 A | 6/1911 | Burke |
| 1,598,017 A | 8/1926 | Scanton et al. |
| 1,804,290 A | 5/1931 | Tschappat |
| 2,694,022 A | 11/1954 | Schrelner |
| 2,897,675 A | 8/1959 | Kocher et al. |
| 2,954,041 A | 9/1960 | Gasche et al. |
| 2,956,737 A | 10/1960 | Hager |
| 3,169,562 A | 2/1965 | Gogel |
| 3,224,260 A | 12/1965 | Lankford |
| 3,331,238 A | 7/1967 | Kost et al. |
| 3,598,157 A | 8/1971 | Farr et al. |
| 3,760,842 A | 9/1973 | Miklya |
| 4,266,813 A | 5/1981 | Oliver |
| 4,712,812 A | 12/1987 | Weir, III |
| 4,916,938 A | 4/1990 | Aikin et al. |
| 4,976,134 A | 12/1990 | Potvin |
| 5,105,653 A | 4/1992 | Konter |
| 5,127,437 A | 7/1992 | Ross, II |
| 5,192,425 A | 3/1993 | Cypers et al. |
| 5,277,224 A | 1/1994 | Hutton et al. |

(Continued)

*Primary Examiner*—David Bochna
(74) *Attorney, Agent, or Firm*—Paul E. Szabo

(57) ABSTRACT

A test apparatus for testing the fluid tightness of pipes of different sizes includes a one-piece main body having a tubular portion defining a chamber with an internally threaded wall portion that can be screwed separately onto an externally threaded pipe in a fluid-tight manner. The one-piece main body has a head portion connected with the tubular portion. The head portion has a gauge port in fluid communication with the chamber. The head portion has a test fluid inlet port in fluid communication with the chamber and the gauge port. The gauge port has the same configuration as the test fluid inlet port whereby a test gauge can be connected in either the gauge port or the test fluid inlet port and a test fluid supply line can be the connected in either the test fluid inlet port or the gauge port.

10 Claims, 2 Drawing Sheets

U.S. PATENT DOCUMENTS

| | | |
|---|---|---|
| 5,404,905 A | 4/1995 | Lauria |
| 5,517,859 A | 5/1996 | Goheen |
| 5,983,706 A | 11/1999 | Marks et al. |
| 6,223,766 B1 | 5/2001 | Shaw et al. |
| 6,553,842 B1 | 4/2003 | Tebeau |
| 6,612,618 B2 | 9/2003 | Giordano |

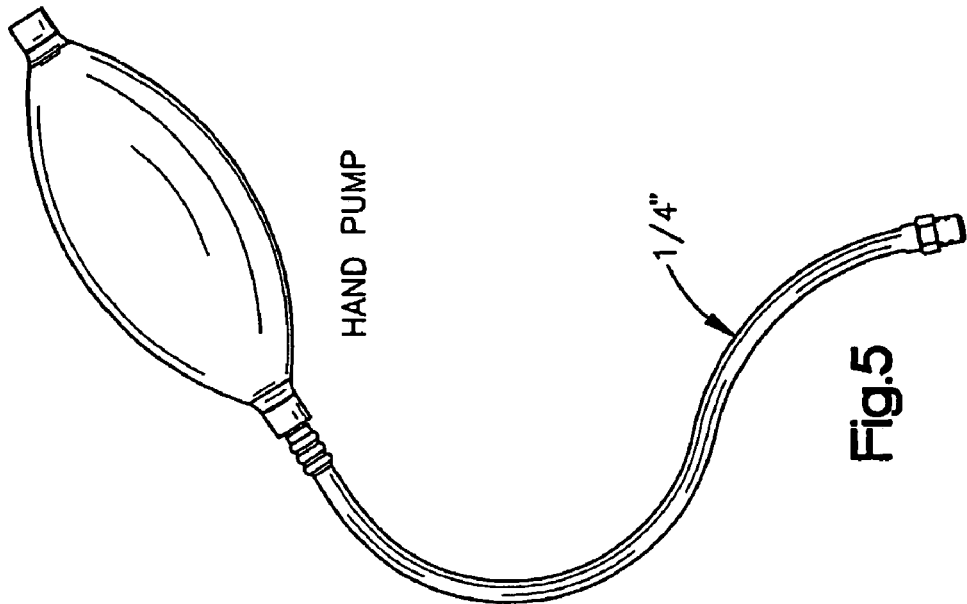
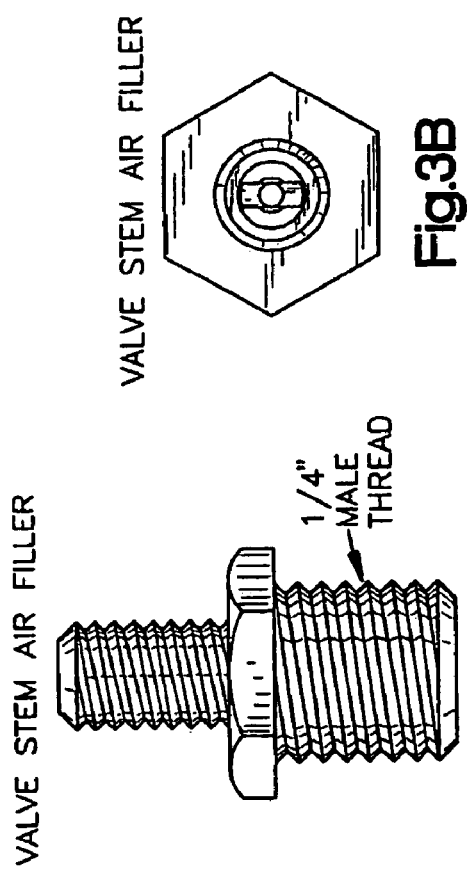
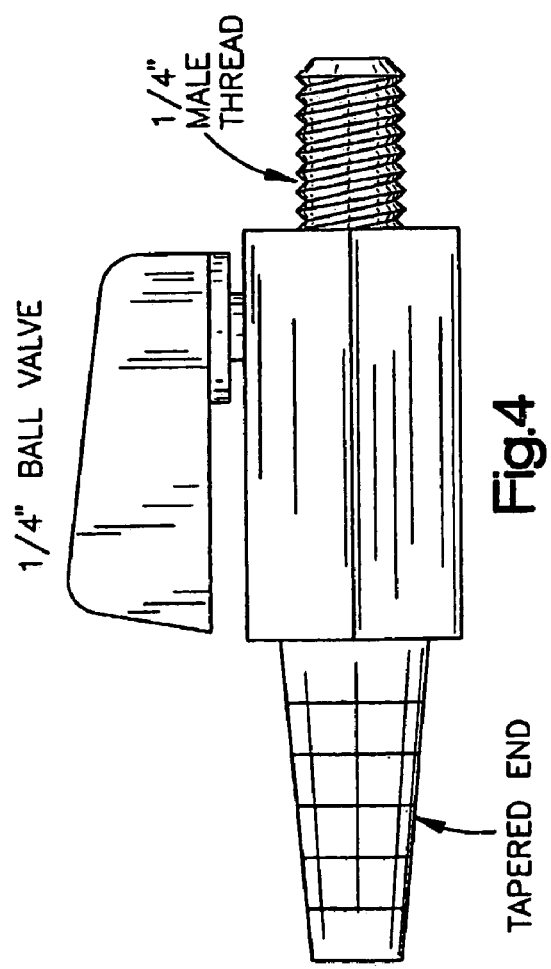

ALL-PURPOSE PRESSURE TEST KIT

CROSS-REFERENCE TO RELATED APPLICATIONS

This application is a continuation of U.S. patent application Ser. No. 10/619,312 titled "All-Purpose Pressure Test Kit", filed Jul. 14, 2003 now abandoned which is a continuation of U.S. patent application Ser. No. 09/993,232 titled "All-Purpose Pressure Test Kit", filed Nov. 16, 2001 now U.S. Pat. No. 6,612,618, now U.S. Pat. No. 6,612,618, issued Sep. 2, 2003. These references are incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Pertains to pipe line pressure testing for the Plumbing and Gas Industry.

BRIEF SUMMARY OF THE INVENTION

Pressure testing pipelines always required the plumber or gasman to make up test devices on the job. To create these devices always required an assortment of fittings and nipples, depending on the system the plumber or gasman is working on. The All-Purpose Pressure Test Kit, with included attachments, can be screwed on to any size male pipe thread ranging from ½" to 2". The entire set of sizes includes ½", ¾", 1", 1¼", 1½", and 2". This will allow the plumber or gasman to save a considerable amount of time and money.

BRIEF DESCRIPTION OF THE SEVERAL VIEWS OF THE DRAWING

There are five figures associated with the All-Purpose Pressure Testing Kit.

FIG. 3—Drawing of the Valve Stem Air Filler attachment included in the kit

FIG. 4—Drawing of the ¼" Ball Valve attachment included in the kit

FIG. 5—Drawing of the Hand Pump attachment included in the kit

DETAILED DESCRIPTION OF THE INVENTION

Figure 1:
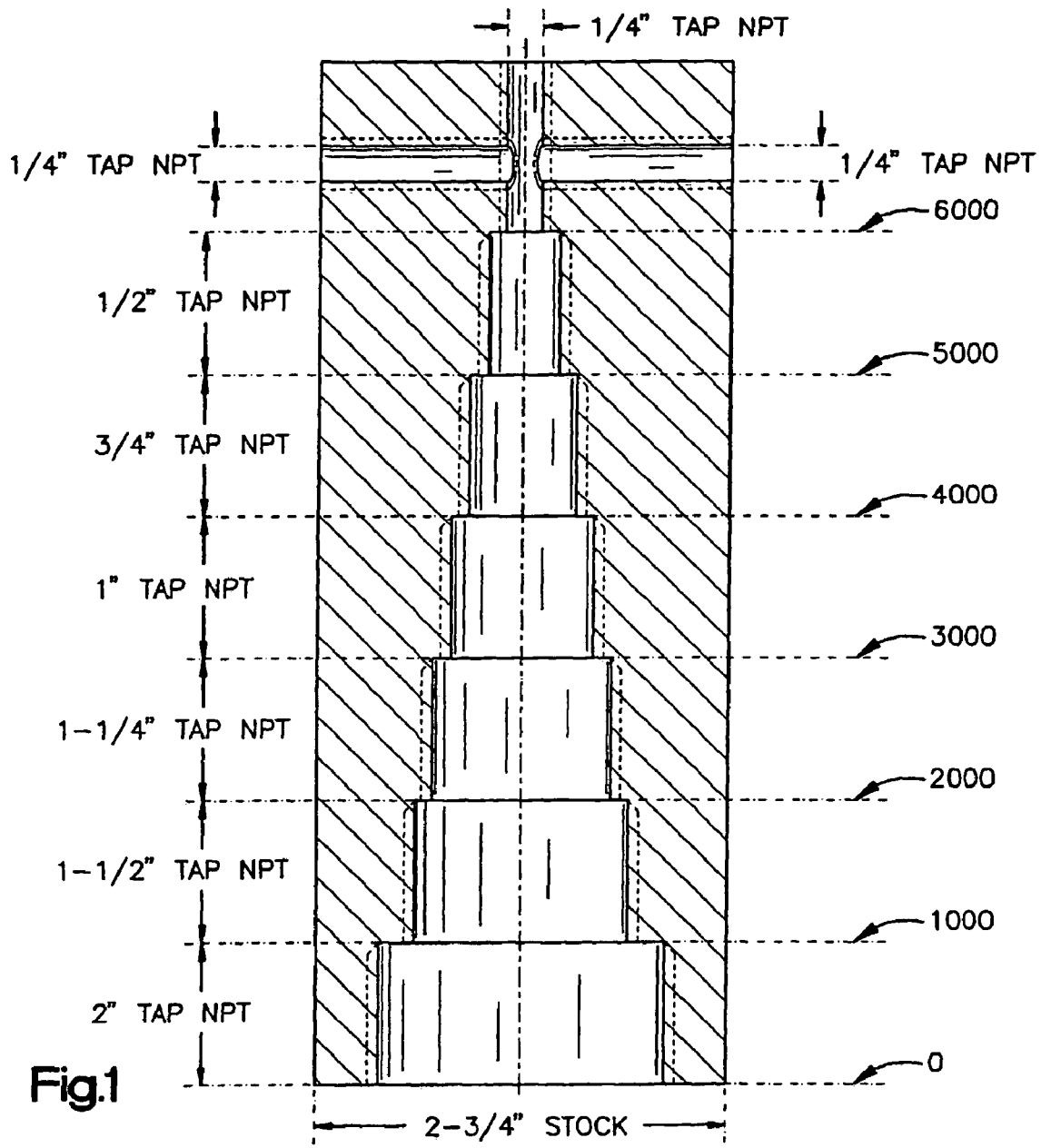
FIG. 1—Drawing of the Main Body of the apparatus
Figure 2A:
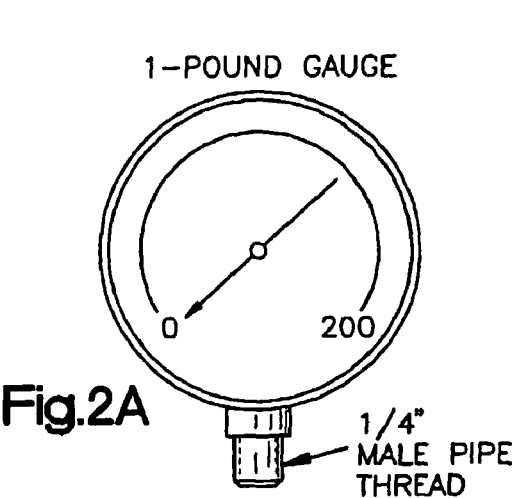
FIG. 2—Drawing of the Gauge attachments included in the kit (1 for ounces, 1 for pounds.)
Figure 2B:
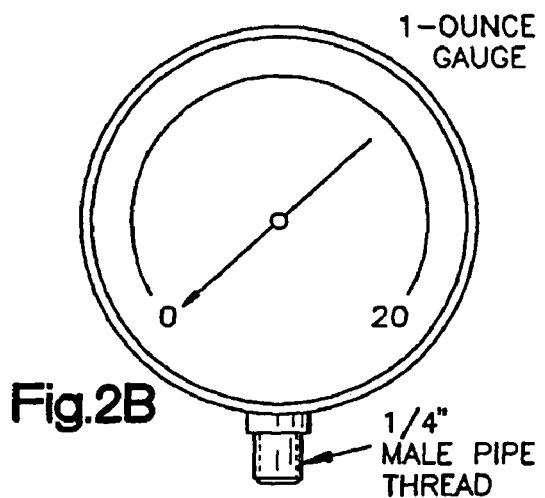

The All-Purpose Pressure Test Kit is used for testing plumbing and gas line installations and repairs. The kit can test the pressure of waste lines, water lines, gas lines, and vent lines. The kit can be used for new and repair work in residential, commercial, and industrial areas. The kit can perform tests ranging from ounces to pounds and on lines that range from ½" to 2". The main body of the All-Purpose Pressure Test Kit apparatus (See FIG. 1) is made of aluminum with three ¼" female taps or threads, one located on top and one on each side. The main body of the apparatus also comes with unique telescopic female threads within it that make up the male pipe size ranges that can be used. The sizes in the telescopic female threads include ½", ¾", 1"1¼", 1½", and 2". The kit also comes with the following attachments:

1—Gauge for ounces with ¼" male thread (See FIG. 2)
1—Gauge for pounds with ¼" male thread (See (FIG. 2)
1—Valve Stem Air Filler with ¼" male thread (See FIG. 3)
1—¼" Ball Valve with ¼" male thread that holds up to 150 psi (See FIG. 4)
1—Hand Pump (See FIG. 5)

Currently, plumbers or gas workers have to use an assortment of fittings and nipples in different sizes to match up with the male thread size requirements for that particular job. The All-Purpose Pressure Test Kit is all that is needed for testing pressure and checking for leaks on the job. You do not have to leave the work environment or go looking for the different parts required to create a test device for that job.

What I claim my invention to be is:

1. A test apparatus for testing the fluid tightness of pipes of different sizes comprising:
    a one-piece main body having a tubular wall defining a chamber, said wall having at least two internally threaded wall portions, each one of said internally threaded wall portions having a different diameter whereby said main body can be screwed separately onto at least two different diameter externally threaded pipes in a fluid-tight manner;
    said one-piece main body having a head portion connected with said tubular wall;
    said head portion having a gauge port in fluid communication with said chamber;
    said head portion having a test fluid inlet port in fluid communication with said chamber and with said gauge port;
    said gauge port having the same configuration as said test fluid inlet port whereby a test gauge can be connected in either said gauge port or said test fluid inlet port and a test fluid supply line can be said connected in either said test fluid inlet port or said gauge port;
    wherein said head portion of said main body includes a third port connected in fluid communication with said chamber and with said gauge port and with said test fluid inlet port, said third port having the same configuration as said test fluid inlet port and as said gauge port.

2. A test apparatus as set forth in claim 1 further comprising a valve stem air filler engageable in said third port when a gauge is engaged in said gauge port and a fluid inlet member is engaged in said fluid inlet port, said valve stem air filler being operative to bleed fluid from said chamber and thereby from a pipe being tested without disconnecting the fluid inlet member from said fluid inlet port.

3. A test apparatus for testing the fluid tightness of pipes of different sizes comprising:
    a one-piece main body having a tubular wall defining a chamber, said wall having at least two internally threaded wall portions, each one of said internally threaded wall portions having a different diameter whereby said main body can be screwed separately onto at least two different diameter externally threaded pipes in a fluid-tight manner;
    said one-piece main body having a head portion connected with said tubular wall;
    said head portion having a gauge port in fluid communication with said chamber;
    said head portion having a test fluid inlet port in fluid communication with said chamber and with said gauge port;

said gauge port having the same configuration as said test fluid inlet port whereby a test gauge can be connected in either said gauge port or said test fluid inlet port and a test fluid supply line can be said connected in either said test fluid inlet port or said gauge port;

further comprising a test fluid inlet member engageable in said test fluid inlet port, said test fluid inlet member having a manually engageable shut-off valve for selectively blocking or enabling fluid flow through said test fluid inlet member.

4. A test apparatus for testing the fluid tightness of pipes of different sizes comprising:

a one-piece main body having a tubular wall defining a chamber, said wall having at least two internally threaded wall portions, each one of said internally threaded wall portions having a different diameter whereby said main body can be screwed separately onto at least two different diameter externally threaded pipes in a fluid-tight manner;

said one-piece main body having a head portion connected with said tubular wall;

said head portion having a gauge port in fluid communication with said chamber;

said head portion having a test fluid inlet port in fluid communication with said chamber and with said gauge port;

said gauge port having the same configuration as said test fluid inlet port whereby a test gauge can be connected in either said gauge port or said test fluid inlet port and a test fluid supply line can be said connected in either said test fluid inlet port or said gauge port;

further comprising a hand pump engageable in said test fluid inlet port for supplying test fluid at a low pressure above atmospheric to said chamber and thereby to a pipe being tested.

5. A test apparatus for testing the fluid tightness of pipes of different sizes comprising:

a one-piece main body having a tubular wall defining a chamber, said wall having at least two internally threaded wall portions, each one of said internally threaded wall portions having a different diameter whereby said main body can be screwed separately onto at least two different diameter externally threaded pipes in a fluid-tight manner;

said one-piece main body having a head portion connected with said tubular wall;

said head portion having a gauge port in fluid communication with said chamber;

said head portion having a test fluid inlet port in fluid communication with said chamber and with said gauge port;

said gauge port having the same configuration as said test fluid inlet port whereby a test gauge can be connected in either said gauge port or said test fluid inlet port and a test fluid supply line can be said connected in either said test fluid inlet port or said gauge port;

wherein said wall has three internally threaded wall portions each having a different diameter whereby said main body can be screwed separately onto three different diameter externally threaded pipes in a fluid-tight manner.

6. A test apparatus as set forth in claim 5 wherein said main body includes a third port connected in fluid communication with said chamber and with said gauge port and with said test fluid inlet port, said third port having the same configuration as said test fluid inlet port and as said gauge port;

said apparatus further comprising a valve stem air filler engageable in said third port when a gauge is engaged in said gauge port and a fluid inlet member is engaged in said fluid inlet port, said valve stem air filler being operative to bleed fluid from said chamber and thereby from a pipe being tested without disconnecting the fluid inlet member from said fluid inlet port;

said apparatus further comprising a test fluid inlet member engageable in said test fluid inlet port, said test fluid inlet member having a manually engageable shut-off valve for selectively blocking or enabling fluid flow through said test fluid inlet member; and said apparatus further comprising a hand pump engageable in said test fluid inlet port for supplying test fluid at a low pressure above atmospheric to said chamber and thereby to a pipe being tested.

7. A test apparatus for testing the fluid tightness of pipes of different sizes comprising:

a one-piece main body having a tubular wall defining a chamber, said wall having at least two internally threaded wall portions, each one of said internally threaded wall portions having a different diameter whereby said main body can be screwed separately onto at least two different diameter externally threaded pipes in a fluid-tight manner;

said one-piece main body having a head portion connected with said tubular wall;

said head portion having a gauge port in fluid communication with said chamber;

said head portion having a test fluid inlet port in fluid communication with said chamber and with said gauge port;

said gauge port having the same configuration as said test fluid inlet port whereby a test gauge can be connected in either said gauge port or said test fluid inlet port and a test fluid supply line can be said connected in either said test fluid inlet port or said gauge port;

wherein said head portion of said main body includes a third port connected in fluid communication with said chamber and with said gauge port and with said test fluid inlet port, said third port having the same configuration as said test fluid inlet port and as said gauge port;

said apparatus further comprising a test fluid inlet member engageable in said test fluid inlet port, said test fluid inlet member having a manually engageable shut-off valve for selectively blocking or enabling fluid flow through said test fluid inlet member.

8. A test apparatus for testing the fluid tightness of externally threaded pipes of different diameters, comprising:

a main body having a tubular wall defining a chamber, said wall having at least two stepped internally threaded wall portions, each one of said stepped threaded wall portions having a different diameter whereby said main body can be screwed separately onto at least two different diameter externally threaded pipes in a fluid-tight manner;

said main body having a head portion connected with said tubular wall;

said head portion having a gauge port in fluid communication with said chamber;

said head portion having a test fluid inlet port in fluid communication with said chamber and with said gauge port;

wherein the at least two stepped internally threaded wall portions comprise three stepped internally threaded wall portions each having a different diameter whereby the main body can be screwed separately onto three different diameter externally threaded pipes in a fluid-tight manner.

9. A test apparatus for testing the fluid tightness of externally threaded pipes of different diameters, comprising:
   a main body having a tubular wall defining a chamber, said wall having at least two stepped internally threaded wall portions, each one of said stepped internally threaded wall portions having a different diameter whereby said main body can be screwed separately onto at least two different diameter externally threaded pipes in a fluid-tight manner;
   said main body having a head portion connected with said tubular wall;
   said head portion having a gauge port in fluid communication with said chamber;
   said head portion having a test fluid inlet port in fluid communication with said chamber and with said gauge port;
   wherein the main body has an elongate cylindrical configuration centered on a longitudinal axis, and the at least two stepped internally threaded wall portions are coaxial on the axis at one end of the elongate main body, whereby threading rotation of the main body to screw the main body onto a pipe to be tested results in rotation of the main body about its longitudinal central axis.

10. A test apparatus for testing the fluid tightness of externally threaded pipes of different diameters, comprising:
   a one-piece main body having a tubular wall defining a chamber, said wall having at least three stepped internally threaded wall portions, each one of said stepped internally threaded wall portions having a different diameter whereby said main body can be screwed separately onto at least three different diameter externally threaded pipes in a fluid-tight manner;
   said one-piece main body having a head portion connected with said tubular wall;
   said head portion having a gauge port in fluid communication with said chamber;
   said head portion having a test fluid inlet port in fluid communication with said chamber and with said gauge port;
   said gauge port having the same configuration as said test fluid inlet port whereby a test gauge can be connected in either said gauge port or said test fluid inlet port and a test fluid supply line can be said connected in either said test fluid inlet port or said gauge port;
   wherein the main body has an elongate cylindrical configuration centered on a longitudinal axis, and the at least three stepped internally threaded wall portions are coaxial on the axis at one end of the elongate main body, whereby threading rotation of the main body to screw the main body onto a pipe to be tested results in rotation of the main body about its longitudinal central axis.

* * * * *